US009821763B2

(12) United States Patent
Yuan

(10) Patent No.: US 9,821,763 B2
(45) Date of Patent: Nov. 21, 2017

(54) HIERARCHICAL BASED VEHICULAR CONTROL SYSTEMS, AND METHODS OF USE AND MANUFACTURE THEREOF

(71) Applicant: Honda Motor Co., Ltd., Tokyo (JP)

(72) Inventor: Alvin Yuan, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/678,470

(22) Filed: Apr. 3, 2015

(65) Prior Publication Data

US 2016/0288796 A1 Oct. 6, 2016

(51) Int. Cl.
*B60R 25/01* (2013.01)
*B60W 40/08* (2012.01)
*B60K 35/00* (2006.01)
*B60K 37/06* (2006.01)
*B60R 16/02* (2006.01)
*B60R 16/023* (2006.01)

(52) U.S. Cl.
CPC ............ *B60R 25/01* (2013.01); *B60K 35/00* (2013.01); *B60K 37/06* (2013.01); *B60W 40/08* (2013.01); *B60K 2350/352* (2013.01); *B60K 2350/355* (2013.01); *B60K 2350/357* (2013.01); *B60R 16/0231* (2013.01); *B60W 2040/0809* (2013.01)

(58) Field of Classification Search
CPC .......... B60W 40/08; B60W 2040/0809; G60R 25/01; B60R 25/01
See application file for complete search history.

(56) References Cited

U.S. PATENT DOCUMENTS

| 6,810,309 | B2 | 10/2004 | Sadler et al. |
| 8,634,980 | B1 | 1/2014 | Urmson et al. |
| 8,706,349 | B2 * | 4/2014 | Rector .............. H04M 1/72577 701/36 |
| 8,744,642 | B2 * | 6/2014 | Nemat-Nasser ...... B60W 40/09 340/439 |
| 8,989,961 | B2 * | 3/2015 | Chien .................... G06F 17/00 455/418 |

(Continued)

FOREIGN PATENT DOCUMENTS

WO 2014146826 A1 9/2014

*Primary Examiner* — Thomas Ingram
(74) *Attorney, Agent, or Firm* — Kenealy Vaidya LLP

(57) ABSTRACT

Some embodiments are directed to hierarchical based computer implemented methods and systems for controlling predetermined vehicle operations upon receiving requests from vehicle occupants. The methods and systems include identifying vehicle occupants regardless of their location within the vehicle, and matching an identified vehicle occupant who has entered a request with one profile of a hierarchy of stored profiles. Each profile can correspond to at least one of the occupants who has been identified, and provides authorization to control certain of the predetermined operations. The methods and systems also include accepting the request to control the requested operation if the matched profile provides authorization to control the requested operation, rejecting the request to control the requested operation if the matched profile does not provide authorization to control the requested operation, and enabling implementation of the requested operation if the request has been accepted based on the matched profile providing authorization.

20 Claims, 6 Drawing Sheets

(56) References Cited

U.S. PATENT DOCUMENTS

| | | | |
|---|---|---|---|
| 9,096,234 B2* | 8/2015 | Frye | B60R 16/023 |
| 9,288,270 B1* | 3/2016 | Penilla | H04L 67/125 |
| 2007/0126604 A1* | 6/2007 | Thacher | G01C 21/26 340/995.13 |
| 2008/0245598 A1* | 10/2008 | Gratz | B60R 25/1004 180/287 |
| 2014/0195214 A1 | 7/2014 | Kozloski et al. | |
| 2014/0306814 A1* | 10/2014 | Ricci | H04W 48/04 340/425.5 |
| 2014/0310788 A1 | 10/2014 | Ricci | |
| 2015/0106736 A1* | 4/2015 | Torman | H04L 67/306 715/745 |
| 2015/0203125 A1* | 7/2015 | Penilla | G06F 21/445 701/1 |
| 2015/0210287 A1* | 7/2015 | Penilla | B60W 40/08 701/49 |
| 2015/0304406 A1* | 10/2015 | Penill | G01C 21/26 709/203 |
| 2016/0046296 A1* | 2/2016 | Offenhaeuser | B60R 16/037 701/24 |

\* cited by examiner

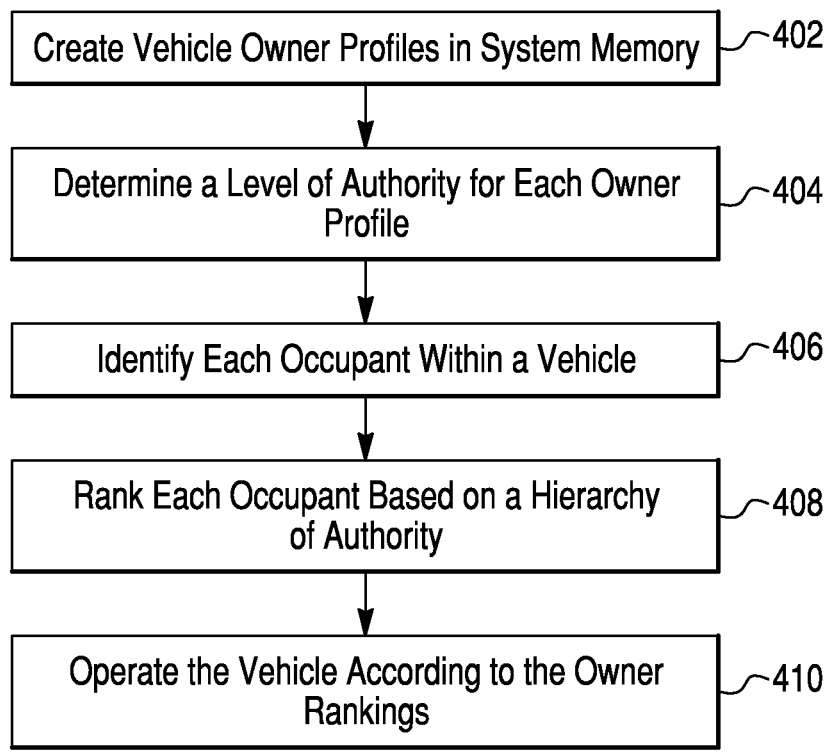

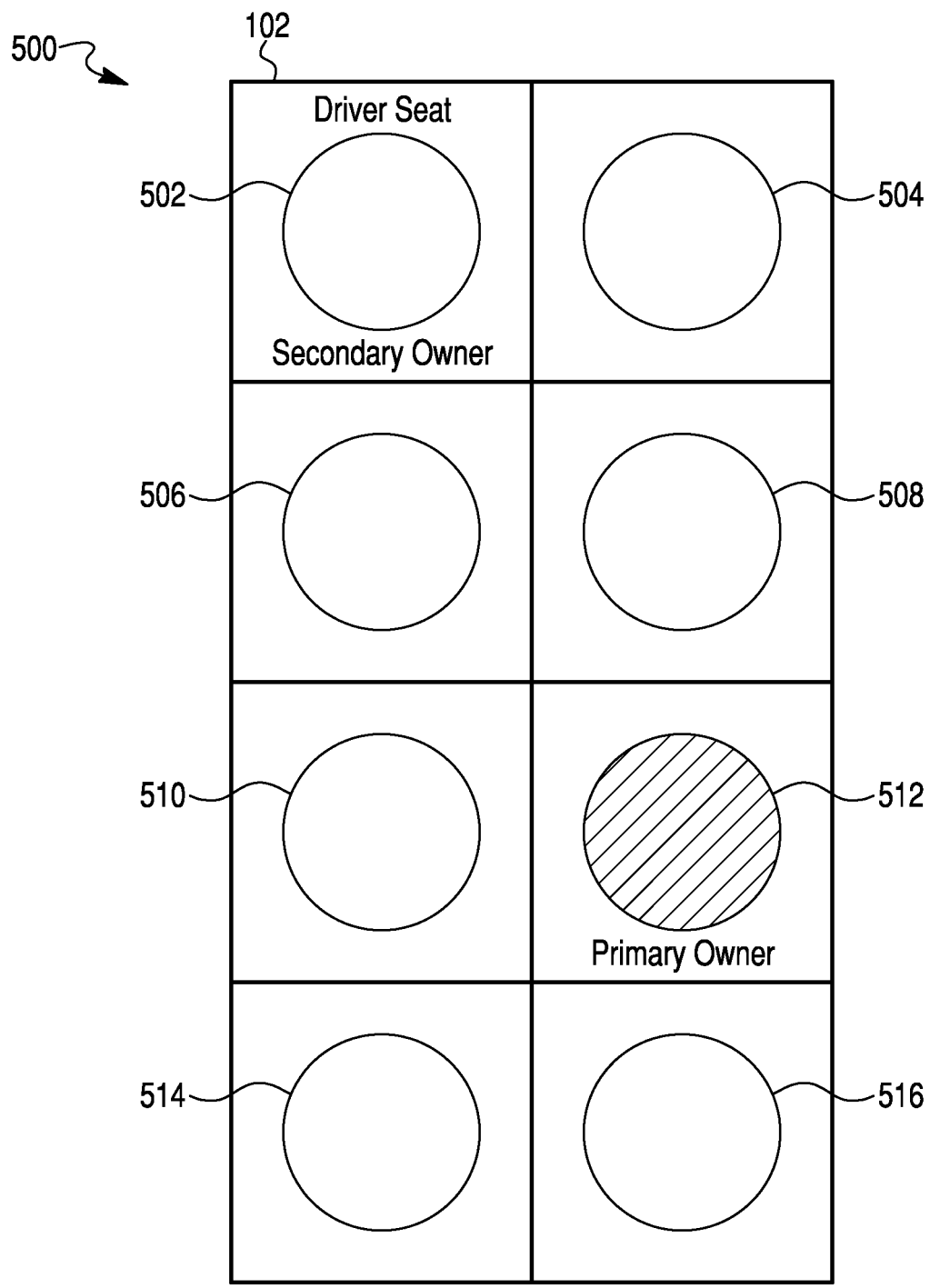

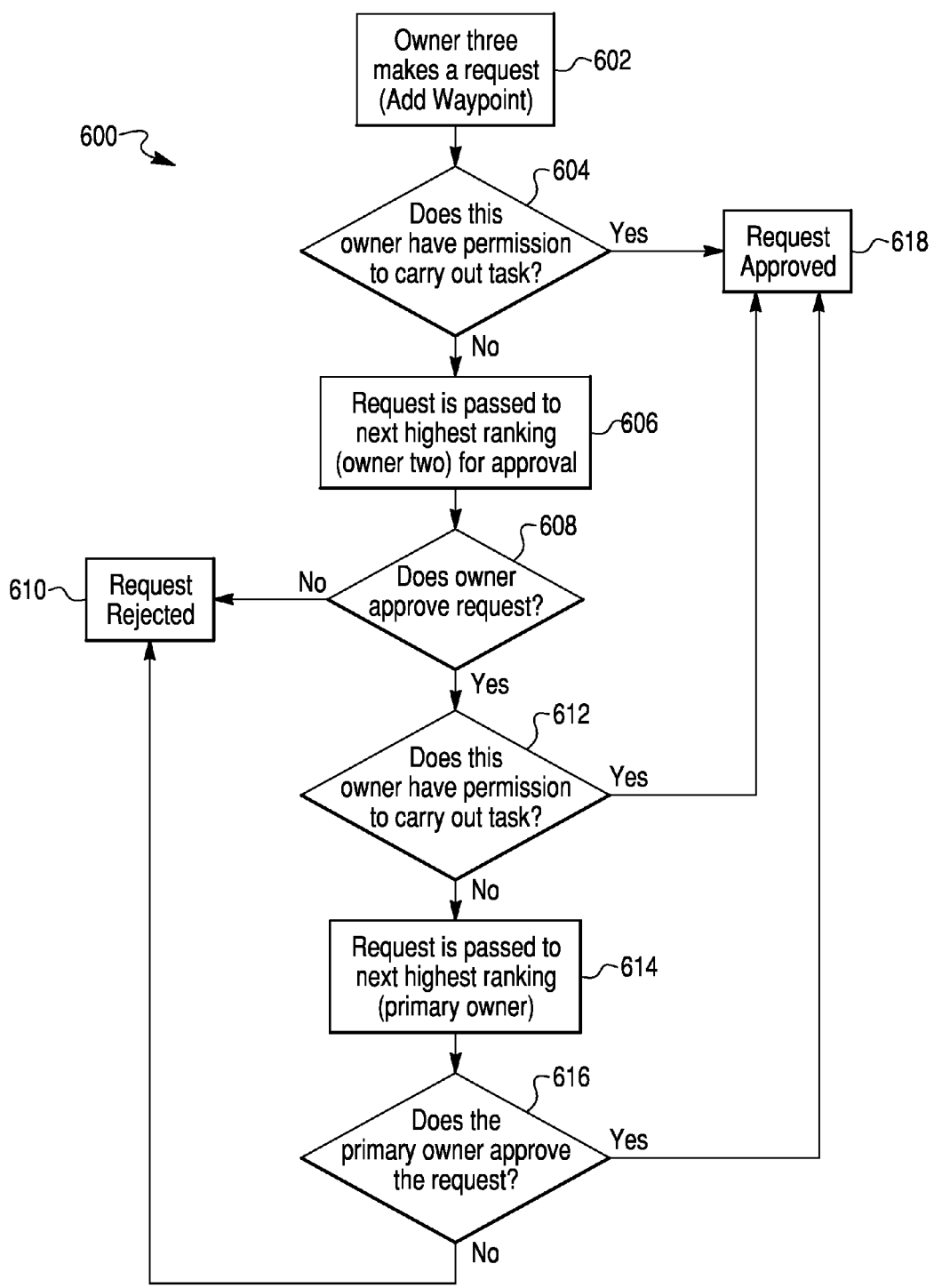

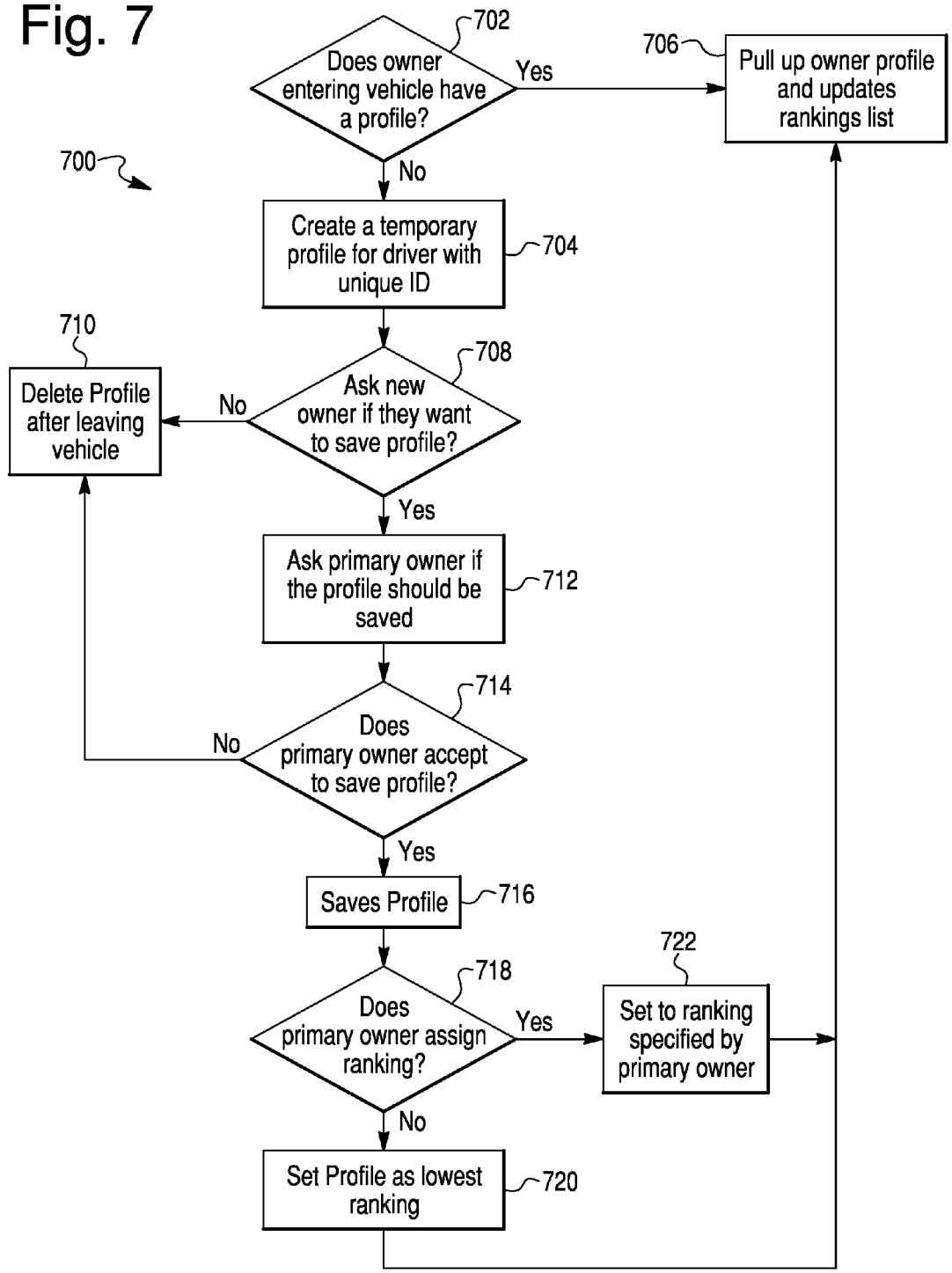

HIERARCHICAL BASED VEHICULAR CONTROL SYSTEMS, AND METHODS OF USE AND MANUFACTURE THEREOF

BACKGROUND

The disclosed subject matter relates to hierarchical based vehicular control systems, and methods of use and manufacture thereof. In particular, the disclosed subject matter relates to such systems and methods that are usable for controlling, or assisting the control of, semi-autonomous and autonomous vehicles (e.g., automobiles, trucks, ships, etc.).

Traditional manually operated vehicles that travel along predetermined routes (such as on highways, roads, streets, paths, etc.) or along other routes of travel (such as in the air, water, space, etc.) are controlled by a vehicle occupant typically designated as the driver or primary operator. These manually operated vehicles often include a designated driver's position for occupation by the intended driver or primary operator. For example, traditional automobiles include a driver's seat, airplanes have a cockpit with a pilot's seat, etc., that serve as the designated driver's position.

Various controls that are relevant to affecting aspects of the vehicle's operation, controls irrelevant to the vehicle's operation, and indicators that provide relevant or helpful information (such as speed, mileage, fuel supply, etc.) can be disposed at locations that are accessible from the intended driver's position. These controls and indicators are typically disposed and otherwise designed to facilitate operation by the designated driver.

SUMMARY

However, it may be beneficial to provide vehicle occupants other than the driver with the ability to have access to some or all of the controls, indicators, etc. described above, including those disposed or otherwise designed to facilitate use by the driver (such as controls for the HVAC system, radio, etc.). For example, an automobile passenger seated in the front passenger seat may have access to some or all of the controls, indicators, etc. that are primarily intended for the driver. In addition, controls, indicators, etc. may be provided and disposed specifically for use by vehicle occupants other than the driver. In fact, control opportunities and options for accessing information (such as via entertainment systems, GPS devices, etc.) by passengers and drivers have increased as vehicles have become more advanced.

These opportunities and options are further enhanced in the context of semi-autonomous and autonomous vehicles. For example, additional controls and indicators may be utilized to operate or access semi-autonomous and autonomous features of these vehicles, such as user interfaces to set destinations or otherwise operate as desired, etc.

The nature of these types of vehicles also enables a reshuffling of passenger locations because the intended driver or primary operator may not necessarily be disposed at a location corresponding to the traditional intended driver's position. In other words, there is no intended driver in the context of an autonomous vehicle in automated driving mode in the sense that an autonomous vehicle drives itself. The intended driver or primary operator may have a less active role than in a manually operated vehicle. The autonomous nature of such vehicles inherently provides the flexibility to enable all occupants to occupy any location within the vehicle, and thus the vehicle owner or driver may not necessarily occupy the traditional driver's position. In other words, an autonomous vehicle to some extent drives itself using an automated control system, thereby enabling the primary operator or driver to sit anywhere within the vehicle.

It may therefore be beneficial to provide vehicle control systems that take into account this flexibility in seating arrangements enabled by semi-autonomous and autonomous vehicles, such as by providing user inputs that are operable from any of multiple locations that may be occupied by the primary operator. For example, user inputs can be provided at each passenger location within the vehicle to enable the primary operator to thereby control the vehicle from any location. Alternatively, centralized controls can be provided that enable access from any location within the vehicle.

These dispersed and centralized user inputs may enable any of the passengers to affect vehicle operations or access information. Thus, providing this flexibility may create situations where anyone within the vehicle can control various aspects of the vehicle or access certain information, regardless of whether the primary operator agrees or otherwise authorizes such control or access. It may therefore be beneficial to provide methods and systems for preventing certain vehicle occupants from performing unauthorized control operations and accessing unauthorized information.

In some of these cases, it may be beneficial to designate a vehicle occupant as having primary responsibility for operating certain vehicular controls that may or may not be directly related to driving the vehicle. The primary occupant or owner of a semi-autonomous or autonomous vehicle can have ultimate authority over all functions of the vehicle, such as providing instructions to a vehicle control system to start the engine, control the path of travel, etc. Occupants other than the primary owner in this context can have lower levels of responsibility or authority to control various aspects of the vehicle. However, the primary owner may provide administrative rights to an occupant having a lower level of authority than the primary owner to enable that occupant to control certain aspects of the vehicle.

It may therefore be advantageous to determine an occupant's level of authority to exercise some level of control over the vehicle's operation based on information other than the occupant's location within the vehicle. This determination can be useful for various reasons, such as to determine whether a certain occupant has the authority to operate certain vehicular controls, and in the case of the primary owner, to enable easy access to the vehicular controls, such as by redirecting control inputs.

This determination can include ranking each vehicle occupant based upon a hierarchical level of authority, with the vehicle's primary owner at the top of the hierarchy. Any type of hierarchical factors can be chosen by the primary owner to rank other occupants. Authorization to control various aspects of the vehicle can be determined based upon this ranking, and control can be implemented using a request (i.e., command) approval process.

Some embodiments are therefore directed to a hierarchical based vehicular control system for enabling vehicle occupants to control predetermined authorized operations. The system can be configured for use with a vehicle that defines multiple distinct locations that may each be occupied by one of the vehicle occupants. The system can include a sensor for enabling identification of the vehicle occupants regardless of their location within the vehicle, and a user input configured to enable the vehicle occupants to enter a request to control one of the predetermined operations.

The system can also include a processor based controller programmed to create and store a hierarchy of profiles. Each profile can correspond to at least one of the occupants who has been identified and provided authorization to control certain of the predetermined operations. The hierarchy of profiles can include a high ranking profile providing authorization to control more of the predetermined operations than a lower ranked profile. The controller can be programmed to: match an identified vehicle occupant who has entered a request with one of the stored profiles, accept the request to control the requested operation if the matched profile provides authorization to control the requested operation, reject the request to control the requested operation if the matched profile does not provide authorization to control the requested operation, and enable implementation of the requested operation if the request has been accepted based on the matched profile providing authorization.

Some other embodiments are directed to a processor based controller for use with a hierarchical based vehicle control system for enabling vehicle occupants to control predetermined authorized operations. The system can be configured for use with a vehicle that defines multiple distinct locations that may each be occupied by one of the vehicle occupants. The system can include a sensor for enabling identification of the vehicle occupants regardless of their location within the vehicle, and a user input configured to enable the vehicle occupants to enter a request to control one of the predetermined operations.

The processor based controller can be programmed to create and store a hierarchy of profiles. Each profile can correspond to at least one of the occupants who has been identified and provided authorization to control certain of the predetermined operations. The hierarchy of profiles can include a high ranking profile providing authorization to control more of the predetermined operations than a lower ranked profile. The controller can be programmed to: match an identified vehicle occupant who has entered a request with one of the stored profiles, accept the request to control the requested operation if the matched profile provides authorization to control the requested operation, reject the request to control the requested operation if the matched profile does not provide authorization to control the requested operation, and enable implementation of the requested operation if the request has been accepted based on the matched profile providing authorization.

Still other embodiments are directed to a hierarchical based computer implemented method for controlling predetermined vehicle operations upon receiving requests from vehicle occupants. The method can include identifying vehicle occupants regardless of their location within the vehicle, and matching an identified vehicle occupant who has entered a request with one profile of a hierarchy of stored profiles. Each profile can correspond to at least one of the occupants who has been identified and providing authorization to control certain of the predetermined operations. The hierarchy of profiles can include a high ranking profile providing authorization to control more of the predetermined operations than a lower ranked profile. The method can include: accepting the request to control the requested operation if the matched profile provides authorization to control the requested operation; rejecting the request to control the requested operation if the matched profile does not provide authorization to control the requested operation; and enabling implementation of the requested operation if the request has been accepted based on the matched profile providing authorization.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 is a flowchart of an exemplary method to identify and rank autonomous vehicle passengers based on owner profiles.

FIG. 5 is a schematic of passenger locations within an autonomous vehicle that have been identified according the method of FIG. 4.

FIG. 6 is a flowchart of an exemplary process to approve a request for controlling the autonomous vehicle of FIGS. 1-3.

FIG. 7 is a flowchart of an exemplary process to add a profile of an occupant of the autonomous vehicle of FIGS. 1-3.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Autonomous Vehicle Control System

Some of the disclosed embodiments relate to vehicles configured with automated driving technology, such as semi-autonomous and autonomous vehicles. In the disclosed embodiments, vehicles configured with automated driving technology can include automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, bicycles, ATVs, trains, trams, light rail trains, boats, ships, watercraft, aircraft, helicopters, or any transport related entity. In fact, the various disclosed methods and apparatus are intended to be usable with any type of automated, semi-automated, or self-driving mode of transport that can travel along, or can be located in proximity to, any improved, unimproved, and/or unmarked route or path. In fact, some embodiments are also applicable to manually operated vehicles.

Some of the disclosed embodiments relate to a vehicle control system and computer-implemented methods associated therewith. Examples of vehicle control systems that could implement the embodiments include systems configured for automated driving technology; adaptive cruise control (ACC); intelligent cruise control; driver-assist for: freeway merging, exiting, and lane-change/lane departure warning; collision warning; integrated vehicle-based safety; automatic guided vehicle; etc. Some of the embodiments are disclosed below in the context of an autonomous vehicle control system configured for use in an autonomous vehicle (vehicle).

Figure 1:
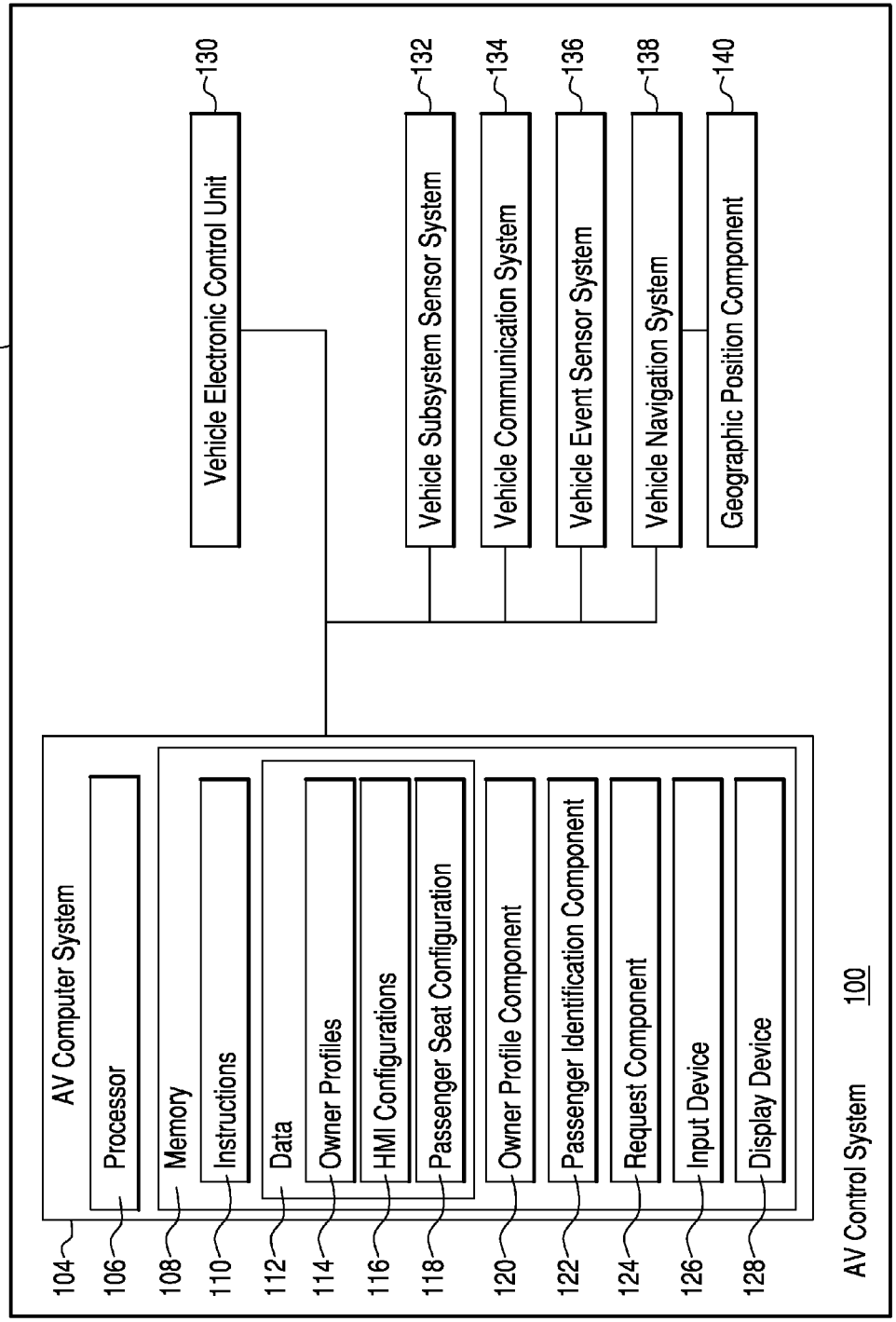
FIG. 1 is a schematic of an exemplary autonomous vehicle control system made in accordance with principles of the disclosed subject matter.

FIG. 1 is a schematic of an exemplary autonomous vehicle control system 100 (control system) of the embodiments. The disclosed control system 100 is intended to be implemented with any known, related art or later developed technologies. Additionally, the disclosed control system 100 may be associated with other vehicles or used in other applications. Other control systems associated with some vehicles may include different elements and/or arrangements as configured for control system 100, but may be configured to operate similar to, and be compatible with, control system 100.

A vehicle 102 may have one or more computers, such as an autonomous vehicle computer system 104 (computer system) including a processor 106, a memory 108 and other components typically present in general or special purpose computers. In some embodiments, the control system 100 may include programmable logic circuits and/or pre-configured logic circuits for executing control system functions. The memory 108 stores information accessible by processor 106 including instructions 110 and data 112 that may be executed or otherwise used by the processor 106. The control logic (in this example, software instructions or computer program code), when executed by the processor 106, causes processor 106 to perform the functions of the embodiments as described herein. The memory 108 may be of any type capable of storing information accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the instructions and data are stored on different types of media.

The instructions 110 may be any set of instructions to be executed directly (such as machine code) or indirectly (such as scripts) by the processor 106. For example, the instructions may be stored as computer code on the computer-readable medium. In this regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 112 may be retrieved, stored or modified by the processor 106 in accordance with the instructions 110. For instance, although the system is not limited by any particular data structure, the data may be stored in computer registers, in a relational database as a table having a plurality of different fields and records, XML documents, flat files, etc. The data may also be formatted in any computer-readable format. The data may include any information sufficient to identify the relevant information, such as numbers, descriptive text, proprietary codes, references to data stored in other areas of the same memory or different memories (including other network locations) or information that is used by a function to calculate the relevant data.

The processor 106 may be any known, related art or later developed processor. Alternatively, the processor may be a dedicated device, such as an ASIC (application-specific integrated circuit), DSP (digital signal processor), etc. Although FIG. 1 illustrates the processor 106, memory 108, and other elements of computer system 104 as being within the same block, it will be understood by those of ordinary skill in the art that the processor 106 and memory 108 may actually include multiple processors and memories that may or may not be stored within the same physical housing. For example, memory 108 may be a hard drive or other storage media located in a housing that is different from that of computer system 104. Accordingly, references to a processor or computer will be understood to include references to a collection of processors, computers or memories that may or may not operate in parallel. Rather than using a single processor to perform the steps described herein, some of the components, for example sensor components and camera components, may each have their own processor that only performs calculations related to the component's specific function.

In an alternative embodiment, the processor 106 may be located remote from the vehicle 102 and communicate with the vehicle wirelessly. In the disclosed embodiments, some of the processes described herein are executed on a processor disposed within the vehicle 102, and others by a remote processor that can be accessed over the wireless network.

Computer system 104 may include all of the components normally used in connection with a computer, such as a central processing unit (CPU) (e.g. processor 406), the memory 108 (e.g., RAM and internal hard drives) storing data 112 and instructions 110, a communicator/annunciator such as a display device 128 (e.g., a monitor having a screen, a small LCD touch-screen or any other electrical device that is operable to display and/or audibly playout information, a heads up projected or integrated display), and a user input device 126 (e.g., a mouse, keyboard, touch screen and/or microphone). Data 112 can include but is not limited to owner profiles 114, human-machine interface (HMI) configurations 116, and passenger seat configuration 118. The computer system 104 can also include components not normally associated with general purpose computers, such as an owner profile component 120, a passenger identification component 122, and an owner request component 124.

The computer system 104 may be capable of communicating with various components of the vehicle 102. For example, computer system 104 may be in communication with the vehicle's electronic control unit (ECU) 130 and may send and receive information from the various systems of vehicle 102, for example a vehicle subsystem sensor system 132, a vehicle communication system 134, a vehicle event sensor system 136, and a vehicle navigation system 138. ECU 130 may be configured to communicate with, and/or control, various components of vehicle 102. When engaged, computer system 104 may control some or all of these functions of vehicle 102. It will be understood that, although various systems and computer system 104 are shown within vehicle 102, these elements may be external to vehicle 102 and/or physically separated by large distances.

As indicated above, the vehicle 102 may also include the vehicle subsystem sensor system 132. The computer system 104 may communicate with sensors in one or more vehicle subsystems to gather data for vehicle 102 speed, direction, acceleration, braking, and/or other factors. The vehicle subsystem sensor system 132 may include, but is not limited to, engine oil/coolant sensing systems, transmission oil sensing systems, brake sensing systems, steering and control sensing systems, fuel storage sensing systems, torque sensors, and speed and acceleration/deceleration sensors (including, but not limited to, lateral, longitudinal, yaw, or rotational sensors), inertia sensor systems, vehicle height sensing systems, etc.

As indicated above, the vehicle 102 may also include the vehicle communication system 134. The computer system 104 may communicate with external communication apparatus for sending and receiving vehicle kinematic and traffic data. For instance, the vehicle communication system 134 can include a transceiver that can communicate with vehicles or infrastructure over a Dedicated Short Range Communications (DSRC) network or other wireless network.

As further indicated above, the vehicle 102 may also include the vehicle event sensor system 136 for collecting traffic data. Traffic data can include detecting the location, orientation, heading, etc., of entities external to the vehicle 102, such as other vehicles, pedestrians, obstacles, traffic signals, signs, wildlife, trees, or any entity that can provide information to control system 100. For example, data useful for autonomous driving and navigation such as traffic vehicle kinematics, roadways and/or paths, navigation, infrastructure, environmental scenarios, weather conditions, roadway conditions, terrain, and/or vehicles merging from one path into a second path can be collected by either or both of the vehicle communication system 134 and vehicle event sensor system 136.

The vehicle event sensor system 136 may collect sensor data from sensor apparatus including radar, lidar, sonar, cameras or any other detection devices which can transmit traffic data that can be processed by the computer system 104. Vehicle sensor systems and DSRC communication systems can provide data that is processed by the computer system 104 in real-time. In other words, the sensors may update their output to reflect external traffic and road conditions continuously or as-demanded to provide updated output to the computer system 104.

The vehicle navigation system 138 can be interoperable with computer system 104 to provide navigation maps and transport information. Vehicle navigation system 138 may be any type of known, related or later developed navigational system. The phrase "navigation information" refers to any information that can be used to assist vehicle 102 in navigating a roadway or path. Navigation information may include traffic data, map data, and roadway classification information data. Examples of navigation information can include street addresses, street names, street or address numbers, intersection information, points of interest, parks, bodies of water, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European).

The vehicle navigation system 138 may also include a geographic position component 140 that may include a GPS receiver 210 (see FIG. 2) to determine the autonomous vehicle's latitude, longitude and/or altitude position. Other location systems, such as laser-based localization systems, inertial-aided GPS, or camera-based localization may also be used to identify absolute or relative locations. The GPS receiver 210 may be used for gathering additional information associated with vehicle 102 that includes, but is not limited to, speed, location, trajectory, distance traveled, acceleration, and other dynamic vehicle information. In alternative embodiments, the vehicle navigation system 138 may also include other features in communication with the computer system 104, such as an accelerometer, a gyroscope, or another direction/speed detection device to determine the direction and speed of the vehicle or changes thereto.

Vehicle 102 may include other apparatus for communicating, and in some cases controlling, the various components associated with vehicle subsystems.

II. Vehicle Systems Associated with the Autonomous Vehicle Control System

Figure 2:
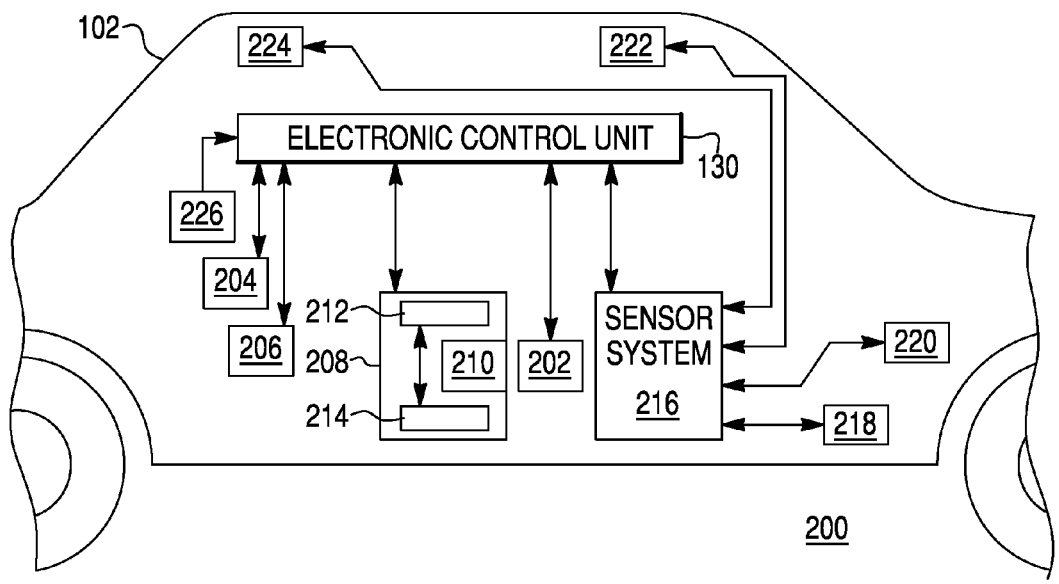
FIG. 2 is a schematic of vehicle systems that can be associated with the autonomous vehicle control system of FIG. 1.

FIG. 2 is a schematic showing vehicle systems 200 that can be associated with the control system 100 of FIG. 1. As shown in FIG. 2, ECU 130 can communicate with a data logger system 202, the vehicle subsystem 204, an autonomous drive controller 206, a navigation system 208, a vehicle sensor system 216, a camera 222, a laser 224, and a DSRC transceiver 226.

In the embodiments, data logger system 202 may communicate with ECU 130 to acquire and log data collected from any of the vehicle systems and subsystems. Data relevant to control system 100 includes, but is not limited to, navigation data, sensor data, radar data, multimedia data, such as images or video streams, audio information, scanner data, etc.

In some embodiments, ECU 130 may be configured to receive instructions from the computer system 104 for commands to be executed by the autonomous drive controller 206, for example, to actuate or suppress a brake, accelerator, steering, etc.

Vehicle 102 can include the navigation system 208 that is configured to be in communication with ECU 130 and perform the functions of vehicle navigation system 138. Navigation system 208 may include a navigation system display 212, and can store map and location information in a navigation database 214. Navigation system display 212 may display navigational maps and information to a user using any type of display technology known or presently unknown in the art. Navigation system display 212 may also communicate information to vehicle 102 using any type of known, related art or later developed audio technology, such as by using predetermined sounds or electronically generated speech.

In an embodiment, the sensor system 216 can communicate with ECU 130 and any number of vehicle sensor devices in any configuration, such as sensor 218, radar system 220, camera 222, and laser 224, disposed at any beneficial area of vehicle 102. Sensor system 216 may communicate with multiple devices that assist in collecting data including, but not limited to, sensors 218 that can collect data for vehicle speed, steering, and inertia (yaw) relative to gravity or a perpendicular plane to gravity. Although one sensor 218 is shown in FIG. 2, it is understood that sensor 218 is a representation of one or more sensors installed within or outside of vehicle 102. Other embodiments of sensors 218 can collect proximity data using rear, front, and side proximity detection sensors 218. The sensor system 216 devices can be advantageous by collecting data for identification and tracking the movement of traffic entities such as motorcycle, passenger car, and commercial vehicle traffic, or any other condition, entity, or vehicle that could provide data.

In an embodiment, DSRC communications can collect traffic and transport related data from other DSRC transceivers that can be configured for a vehicle, pedestrian, building, tower, billboard, traffic signal, roadway sign, or any transport related entity or user. Such information and data received by DSRC transceiver 226 can be saved to data logger system 202 and/or processed by computer system 104.

III. Vehicle Interior

Figure 3:
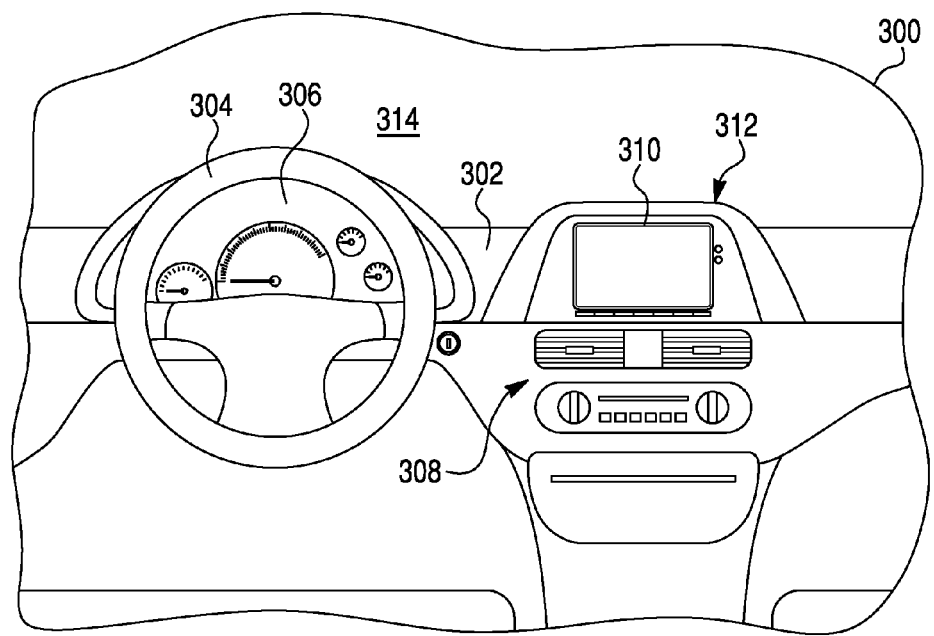
FIG. 3 is a schematic of an exemplary design of an autonomous vehicle interior associated with the autonomous vehicle control system of FIG. 2.

FIG. 3 is a schematic of an exemplary design of a vehicle interior 300 associated with the vehicle 102 and control system 100 of FIG. 1. The vehicle interior 300 may include, for example, a dashboard 302, a steering apparatus such as a steering wheel 304, an instrument panel 306, and a center portion 308. Center portion 308 can include one or more devices associated with the interior of the vehicle, including, but not limited to: audio devices, video devices, navigation devices, as well as any other types of devices. In addition, center portion 308 can be associated with controls for one or more systems of vehicle 102 including, but not limited to: climate control systems, radio and sound systems, and other types of systems. The vehicle interior 300 may also have a display device 310 for displaying information from control system 100, and/or other related or unrelated vehicular systems. In some embodiments, vehicle interior 300 can include a driver vehicle interface 312 that may include the display device 310. Examples of display device 310 include, but are not limited to, LCDs, CRTs, ELDs, LEDs, OLEDs, heads-up type displays, or electronic paper displays each with or without a touchscreen, as well as other types of displays. Display device 310 can include a touchscreen for use as the user input device 126 for activating or deactivating one or more control system 100 modes, and for enabling a user to provide information, such as navigation destination or traffic information, to the computer system 104. In alternative embodiments, driver vehicle interface 312 can include buttons, a keypad, or other types of user input devices 126. In another embodiment, driver vehicle interface 312 can include a heads-up projection type display that is configured to project an image onto one or more surfaces of vehicle interior 300, such as windshield 314. In some embodiments, display device 310 can be located in any portion of vehicle interior 300, or can be a portable device. For example, display device 310 can be located within instrument panel 306 or anterior to a passenger seat headrest (not shown).

In addition, while display device 310 can be configured to present visual information for computer system 104, display device 310 can be shared with other devices or systems within vehicle 102 such as vehicle navigation system 138, vehicle communication system 134, collision warning system, etc. In an example, display device 310 may display vehicle operation information, traffic information, alerts, driving information, or navigation maps to a vehicle operator.

IV. Methods of Operation

The flowchart in FIG. 4 discloses an exemplary process to identify and rank vehicle passengers based on a hierarchy of authority. The exemplary process 400 can be implemented partially or entirely using the embodiments for devices and processes described in the figures. However, the devices, systems, and methods of the embodiments may be applied to other embodiments, vehicles, vehicular control systems, vehicle computer systems, etc.

The process 400 may include a step 402 to create owner profiles in computer system memory 108 for each occupant or potential occupant of vehicle 102. Occupant data may include personal information, such as name and contact information. Occupant security credentials, such as a user name and password, may be entered and saved into a profile, as well as biometric information, such as facial scans for facial recognition, voice print files for voice recognition, and/or fingerprint scans for fingerprint recognition. Owner profiles may also include identification information synchronized to a key FOB, smart phone, mobile phone, personal digital assistant, USB key, or other wireless or connectable hardware device. Owner profiles may also include specific human machine interface (HMI) configurations that the occupant can configure and save, such as seating adjustments, external mirrors adjustments, operating temperatures of vehicle heating and air conditioning, etc. Owner profiles may be saved into owner profile data 114.

The process 400 may also include step 404 to determine a level of authority for each owner profile created in step 402. According to the embodiments, it may be advantageous for autonomous vehicles to identify the level of authority of an occupant to exercise some level of control over the operation of the vehicle based on information other than the occupant's location within the vehicle.

The determination of a level of authority for each owner profile 404 can be useful for various reasons, such as to determine whether a certain occupant has the authority to operate certain vehicular controls. An occupant with ultimate authority to operate and/or issue commands for vehicular controls can be designated as a primary owner of the vehicle. Occupants other than the primary owner in this context are identified as "owners" of the vehicle who may have some lesser control over operation of the vehicle. Varying levels of authority may be defined for each owner, and the types or categories of vehicle operations that are permissible under a certain level may be approved by the primary owner and saved into owner profile data 114 for each occupant.

The process 400 may also include step 406 to identify each occupant within the vehicle 102. In this context, the passenger identification component 122 can identify both the occupant (e.g., a passenger within the vehicle matches an owner profile) and a location of the occupant within a vehicle (e.g., driver's seat, back seat, etc.). Certain vehicular controls that can be accessed from a seat location (e.g., via a touchscreen in front of or near to a seat position), can be activated according to the level of authority of the passenger in the seat. Alternatively, portable devices that can connect to computer system 104 and be used to control certain vehicular controls can be activated according to the level of authority of the occupant using the portable device. For example, if the passenger is identified as the primary owner, then the vehicular controls accessible from the primary owner's seat (which, as described above, may or may not be the typical driver's seat) can control all operations and systems of vehicle 102.

The passenger identification can be performed by passenger identification component 122 in various ways, such as by using a seat sensor, key FOB or other wireless hardware device carried by a passenger, biometrics (e.g., facial, speech, fingerprint, etc. that is matched to owner profile data 114), connected mobile phone, etc. The passenger seat configuration may be saved as passenger seat configuration data 118.

The control system 100 can perform various actions when the vehicle occupant is identified, including loading specific human machine interface (HMI) configurations that the occupant saved in his or her owner profile, such as adjusting seating and making requests to control the vehicle (wherein the request is subject to the approval process based on the owner ranking hierarchy, subject to the fact that the highest ranking owner has the ability to override the system and directly grant approval).

Once occupants are identified, the process 400 may include step 408 to rank each occupant based on a hierarchy of authority. The passenger identification component 122 determines where the vehicle occupant fits into the hierarchical ranking. The identification process 408 includes ranking each vehicle occupant based upon a hierarchy. Each occupant's level of authority can be determined from the occupant's owner profile. An algorithm in the passenger identification component 122 can calculate predetermined factors that have been either pre-set according to a set of standard rules for the operation of the vehicle 102 or customized factors that can be a set of rules saved into data 112 by the primary owner. For example, the primary owner of vehicle 102 can be ranked at the top of the hierarchy, whereas a passenger with little or no operational authority, such as a passenger without a driver's license, can be ranked at the bottom of the hierarchy.

Thus, vehicle operation is determined by the owner hierarchy and is based on order of ownership, and specifically involves a request approval process that requires approval for requests or commands to control the vehicle 102 along a ranked list of vehicle owners (see FIG. 6). However, administrator rights may be granted by higher ranking vehicle owners to streamline the approval process.

As an example of ranking vehicle owners without regard to occupant location, FIG. 5 is an exemplary schematic 500 of passengers within vehicle 102 that have been identified, using the processes and systems described above. Vehicle 102 includes a driver's seat 502, front passenger seat 504, second row driver-side passenger seat 506 and passenger seat 508, third row driver-side passenger seat 510 and passenger seat 512, and back row driver-side passenger seat 514 and passenger seat 516. After occupants enter vehicle 102, the passenger identification component 122 can identify occupants sitting in driver's seat 502 and passenger seat 512. The passenger identification component identifies the passengers according to one or more sensors or scans, such as a biometric scan or facial recognition using a camera and specialized software, and matches owner profiles from saved owner profile data 114 to the respective occupants. However, as discussed above, it should be understood that the passenger identification component can rely on other process(es) for passenger identification. The algorithm then ranks the occupants according to level of authority recorded in each profile.

In the example shown in FIG. 5, occupants of vehicle 102 are identified as a primary owner who occupies seat position 512 and secondary owner who occupies the driver's seat 504. Since the vehicle 102 can be operated from any seat, although a secondary owner occupies driver's seat 502, the operational control of the vehicle 102 is activated at seat 512, i.e., the location of the primary owner. In this embodiment, the primary owner is located within the vehicle 102.

However, embodiments also include or otherwise cover the situation where the primary owner is located outside of the vehicle 102. In other words, the primary owner may be located outside of vehicle 102, and therefore would not occupy any seat within the vehicle 102. In such an example, the primary owner may control the operation of vehicle 102 using a portable input device 126, e.g., tablet computer or mobile telephone, that can communicate with the control system 104. Alternatively, or in addition, the primary owner may not exercise any direct control over the vehicle 102 and only address (e.g., affirm or reject) requests made by other owners, as described below. In still other embodiments, the primary owner may not even address requests when not occupying a seat or being otherwise disposed within the vehicle.

The process 400 may further include step 410 to operate the automated vehicle 102 according to the hierarchical owner rankings. In operation, certain aspects of the control system 100 focus on the higher ranking owner within the vehicle 102. For example, cameras and associated facial recognition programs in memory 108 can be provided within the vehicle 102 that focus on the highest ranking owner, such that the computer system 104 becomes more aware of the primary owner's facial expressions and mannerisms for the purpose of better accommodating, interpreting, and predicting the primary owner's requests. Microphones within the vehicle 102 can focus on the highest ranking owner's voice and seat location, such that the computer system 104 becomes more aware of the primary owner's vocabulary and intonations for the purpose of better accommodating, interpreting, and predicting the primary owner's commands and/or requests. In the example where the primary owner is located outside the vehicle, the primary owner can be identified by wireless communications between the primary owner's personal communication device, e.g. smart phone, key FOB, computer, etc., and the computer system 104 via the vehicle communication system 134.

Certain processes take priority if issued by the top or higher ranking owners with the level of authority to control the processes. For example, a preferred driving mode can be adjusted to suit a top ranking owner, such as in the case where a top ranking owner prefers sports mode and the control system 100 thereby enables the vehicle to propel itself in a more spirited fashion.

In operation, commands and/or requests from occupants are approved or rejected by owner request component 124 based on the hierarchical ranking of the requestor and other owners. FIG. 6 is a flowchart of an exemplary process to approve a request for controlling the vehicle 102. For illustration of the process, the exemplary approval process 600 assumes there are three identified owners within vehicle 102 who have been ranked according to levels of authority as primary owner, owner two, and owner three. The number of identified owners in the example of FIG. 6 is merely exemplary. The process for FIG. 6 may be expanded or contracted for any number of owners for the vehicle 102.

The process initiates at step 602, when a certain owner (in this case owner three) transmits a request to computer system 104 via user input device 126, such as a request to add a waypoint to a current navigation route. Owner request component 124 inquires, in step 604, with owner profile data 114 as to whether owner three has permission, based on owner three's level of authority, to command computer system 104 to carry out the task. If owner three has a proper level of authority in step 604, then the request is approved in step 606. If owner request component 124 determines that owner three does not have permission to carry out the task, then the process continues to step 606 where the request is passed to the next highest ranking owner for approval (in this case owner two) for approval. In step 612, the owner request component 124 determines whether owner two has permission to carry out the task (i.e. to approve the request of owner three), and if so then the request is approved in step 606. If owner two has permission in step 608, then owner two may alternatively reject the request in step 610. If owner request component 124 determines that owner two does not have permission to carry out the task (i.e., to approve the request from owner three), then the request passes in step

614 to the next highest ranking owner for approval, which in this case the primary owner. The owner request component 124 can recognize from owner profile data 114 that the primary owner has permission to approve the request. In step 616, the owner request component 124 determines whether the primary owner approves the request, and if so then in step 606 the request is approved and can be implemented by computer system 104. However, in step 616 if the primary owner denies the request, then the request is rejected in step 610. In the embodiments, the primary owner can interject and approve or reject the pending request at any point in the process.

In the example where the primary owner is located outside of the vehicle 102, a request that is transmitted internally within the vehicle 102 cannot be considered by the primary owner, who as stated above is not inside the vehicle 102. However in an alternative embodiment where the primary owner is provided with the ability to address requests, the request can be transmitted wirelessly by computer system 104 to the primary owner via the vehicle communication system 134. The primary owner can receive the request on any type of mobile device or computer device that is known or currently unknown in the art. A primary owner located outside of the vehicle 102 can receive a request on a mobile telephone in the form of a message or on a personal computer in the form of an Email. The primary owner may respond to the request with a reply to the message or Email to either approve or reject the request.

Embodiments are intended to include or otherwise cover any and all additional operations relevant to addressing the situation where the primary owner is disposed outside of the vehicle. For example, in situations where the primary owner is disposed outside of the vehicle and is not intended to play any role in the vehicle's operations, the highest ranking occupant may fill the role of the primary owner. Alternatively, in embodiments where the primary owner is intended to have the ability to address requests, then as disclosed above the primary owner may address such requests wirelessly. If the primary owner in these situations fails to respond, then either the second highest ranking owner or the highest ranking occupant may fill the role of the primary owner in this respect. The above operations are merely provided for exemplary purposes, and as indicated above embodiments are intended to include or otherwise cover any relevant operations.

In some situations, a new occupant within an automated vehicle may not have an owner profile saved in owner profile data 114. For example during the process in step 406 where passenger identification component 124 identifies the occupants of the vehicle 102, a new occupant may be unrecognized by the computer system 104 and therefore lack an owner profile ranking of hierarchy according to a level of authority. If the passenger is not included on the ranking list, then a temporary profile can be created for the passenger.

FIG. 7 is a flowchart of an exemplary process 700 for adding a profile of a new passenger within the vehicle 102. The process 700 may begin at step 702 where passenger identification component 122 inquires as to whether an occupant entering the vehicle 102 has an owner profile saved in owner profiles data 144. If the occupant has an owner profile, then in step 706 the occupant is associated with the owner's retrieved profile and the ranking list created in step 408 for the vehicle 102 is updated. However, if the new occupant does not have an owner profile, then the process continues to step 704 where owner profile component 120 can create a temporary profile for the new occupant with a unique identification associated with the profile. After the temporary profile is created, the owner profile component 120 can query the new owner in step 708 as to whether to save the temporary profile. If the new owner does not want the profile saved, then in step 710 the profile is deleted after the new owner exits the vehicle 102 or alternatively after a predetermined time period. However, if the new owner responds to save the new profile, then in step 712 the owner profile component 120 queries the primary owner as to whether the temporary profile of the new owner should be saved. If the primary owner in step 714 decides not to save the new profile, then in step 710 the profile is deleted after the new owner leaves the vehicle 102 or alternatively after a predetermined time period. However, if the primary owner decides to save the temporary profile, then the temporary profile data is saved in step 716 into owner profile data 114.

In step 718, the process 700 may include the owner profile component 120 querying the primary owner to assign a level of authority to the new profile. If the primary owner declines to set a level of authority for the new profile, then in step 720 the owner profile component 120 sets the new profile as a lowest ranking by default. However, if the primary owner chooses to set a level of authority for the new profile, then in step 722 the ranking (and therefore level of authority to operate vehicle 102) for the new profile is saved in owner profile data 114. After the level of authority is set by the owner profile component 120 or by the primary owner, the owner profile is associated with the new occupant in vehicle 102 and the vehicle's hierarchical ranking list according to level of authority is updated by computer system 104.

The above described techniques may take the form of computer or controller implemented processes and apparatuses for practicing those methods. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the embodiments. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

V. Alternative Embodiments

While certain embodiments of the invention are described above, and FIGS. 1-7 disclose a best mode for practicing the various inventive aspects, it should be understood that the invention can be embodied and configured in many different ways without departing from the spirit and scope of the invention.

Exemplary embodiments are intended to include or otherwise cover any type of ranking and/or hierarchical process and system for occupants to exercise authority to control and operate the vehicle 102. In other words, exemplary embodiments are intended to cover any application of a control system based on a level of authority between a primary owner and occupants of autonomous vehicles, trucks, ships, aircraft, etc.

Some of the exemplary embodiments are disclosed in the context of semi-autonomous and autonomous vehicles. However, any and all of the disclosed features can also be applied to other types of vehicles, such as manually operated vehicles. In fact, some embodiments can be applied in contexts that do not involve vehicles.

Exemplary embodiments are intended to include or otherwise cover any type of a control system for vehicle 102 according to the embodiments that can be operated outside of the vehicle 102 and that can communicate instructions and commands for execution of control system operations. An example of a control system that can be operated outside of an vehicle 102 is computer system 104 located in a server that is remote from and communicates with vehicle 102 over a wireless network, such as a cellular data network, DSRC network, etc.

Exemplary embodiments are intended to cover execution of method steps on any appropriate specialized or general purpose server, computer device, or processor in any order relative to one another. Some of the steps in the embodiments can be omitted, as desired, and executed in any order.

A computer architecture of the embodiments may be a general purpose computer and/or processor or a special purpose computer and/or processor. A computer and/or processor can be used to implement any components of the computer system 104 or the computer-implemented methods of the embodiments. For example, components of computer system 104 can be implemented on a computer via its hardware, software program, firmware, or a combination thereof. Although individual computers or servers are shown in the embodiments, the computer functions relating to computer system 104 may be implemented in a distributed fashion on a number of similar platforms, to distribute the processing and/or functional load.

Embodiments are also intended to include or otherwise cover methods of using and methods of manufacturing the control system 100 disclosed above. The methods of manufacturing include or otherwise cover processors and computer programs implemented by processors used to design various elements of the control system 100 above. For example, embodiments are intended to cover processors and computer programs used to design or test the control system 100.

Exemplary embodiments are intended to cover all software or computer programs capable of enabling processors to execute instructions and implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi networks, radio, television, cable, satellite, and/or any other delivery or tunneling mechanism for carrying data. A network may include multiple networks or sub-networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention.

What is claimed is:

1. A hierarchical based vehicle control system for enabling vehicle occupants to control predetermined authorized operations, the system being configured for use with a vehicle that defines multiple distinct locations that may each be occupied by one of the vehicle occupants, the system comprising:

a sensor configured to enable identification of the vehicle occupants regardless of their location within the vehicle;

a user input configured to enable the vehicle occupants to enter a request to control one of the predetermined operations; and a processor based controller programmed to:

create and store a hierarchy of profiles, each profile corresponding to at least one of the occupants who has been identified and providing authorization to control certain of the predetermined operations, the hierarchy of profiles including a high ranking profile providing authorization to control more of the predetermined operations than a lower ranked profile, match an identified vehicle occupant who has entered a request with one of the stored profiles, accept the request to control the requested operation if the matched profile provides authorization to control the requested operation, reject the request to control the requested operation if the matched profile does not provide authorization to control the requested operation, and request approval to authorize the previously rejected request from an occupant other than the requesting occupant who has a higher ranked profile than the requesting occupant.

2. The hierarchical based vehicle control system of claim 1, wherein the processor based controller is further programmed to: enable implementation of the requested operation if the request has been approved by the other occupant.

3. The hierarchical based vehicle control system of claim 2, wherein the other occupant, who has a higher ranked profile than the requesting occupant, has the next highest ranked profile relative to the requesting occupant.

4. The hierarchical based vehicle control system of claim 3, wherein the processor based controller is further programmed to: enable the other occupant to accept the request to control the requested operation if the other occupant's profile provides authorization to control the requested operation, and reject the request to control the requested operation if the other occupant's profile does not provide authorization to control the requested operation.

5. The hierarchical based vehicle control system of claim 4, wherein the processor based controller is further programmed to: request approval to authorize a previously rejected request, where the rejection was based on the other occupant's profile not providing authorization to control the requested operation, from a third occupant who has a higher ranked profile than the other occupant.

6. The hierarchical based vehicle control system of claim 5, wherein the processor based controller is further programmed to: enable the third occupant to accept the request to control the requested operation if the third occupant's profile provides authorization to control the requested operation.

7. The hierarchical based vehicle control system of claim 1, wherein the processor based controller is further programmed to: designate a highest ranking profile of the hierarchy of profiles as a primary owner profile corresponding to a primary owner of the vehicle, the primary owner profile providing authorization to control all of the predetermined operations.

8. The hierarchical based vehicle control system of claim 7, wherein the processor based controller is further programmed to: request approval to authorize a previously rejected request from the primary owner of the vehicle if the primary owner of the vehicle is disposed within the vehicle, and enable implementation of the requested operation if the request has been approved by the primary owner of the vehicle.

9. The hierarchical based vehicle control system of claim 1, wherein the processor based controller is further programmed to: prioritize a request made by an occupant with a corresponding profile having a rank that is relatively high over a request made by an occupant with a corresponding profile having a rank that is relatively lower.

10. The hierarchical based vehicle control system of claim 1, wherein the processor based controller is further programmed to, upon identification of a new occupant that does not have a stored corresponding profile, create and store a temporary profile corresponding to the new occupant having a rank that is below all existing profiles of the hierarchy, and request approval from an occupant having a profile that is higher than all other occupants to modify and approve the rank of the temporary profile.

11. A processor based controller for use with a hierarchical based vehicle control system for enabling vehicle occupants to control predetermined authorized operations, the system being configured for use with a vehicle that defines multiple distinct locations that may each be occupied by one of the vehicle occupants, the system including a sensor for enabling identification of the vehicle occupants regardless of their location within the vehicle, and a user input configured to enable the vehicle occupants to enter a request to control one of the predetermined operations, the processor based controller being programmed to:

create and store a hierarchy of profiles, each profile corresponding to at least one of the occupants who has been identified and providing authorization to control certain of the predetermined operations, the hierarchy of profiles including a high ranking profile providing authorization to control more of the predetermined operations than a lower ranked profile, match an identified vehicle occupant who has entered a request with one of the stored profiles, accept the request to control the requested operation if the matched profile provides authorization to control the requested operation, reject the request to control the requested operation if the matched profile does not provide authorization to control the requested operation, and request approval to authorize a previously rejected request from an occupant other than the requesting occupant who has a higher ranked profile than the requesting occupant.

12. The processor based controller of claim 11, further programmed to: enable implementation of the requested operation if the request has been approved by the other occupant.

13. The processor based controller of claim 12, wherein the other occupant, who has a higher ranked profile than the requesting occupant, has the next highest ranked profile relative to the requesting occupant.

14. The processor based controller of claim 13, further programmed to: enable the other occupant to accept the request to control the requested operation if the other occupant's profile provides authorization to control the requested operation, and reject the request to control the requested operation if the other occupant's profile does not provide authorization to control the requested operation.

15. The processor based controller of claim 14, further programmed to: request approval to authorize a previously rejected request, where the rejection was based on the other occupant's profile not providing authorization to control the requested operation, from a third occupant who has a higher ranked profile than the other occupant.

16. The processor based controller of claim 15, further programmed to: enable the third occupant to accept the request to control the requested operation if the third occupant's profile provides authorization to control the requested operation.

17. The processor based controller of claim 11, further programmed to: designate a highest ranking profile of the hierarchy of profiles as a primary owner profile corresponding to a primary owner of the vehicle, the primary owner profile providing authorization to control all of the predetermined operations, request approval to authorize a previously rejected request from the primary owner of the vehicle if the primary owner of the vehicle is disposed within the vehicle, and enable implementation of the requested operation if the request has been approved by the primary owner of the vehicle.

18. The processor based controller of claim 11, further programmed to: prioritize a request made by an occupant with a corresponding profile having a rank that is relatively high over a request made by an occupant with a corresponding profile having a rank that is relatively lower.

19. The processor based controller of claim 11, further programmed to, upon identification of a new occupant that does not have a stored corresponding profile, create and store a temporary profile corresponding to the new occupant having a rank that is below all existing profiles of the hierarchy, and request approval from an occupant having a profile that is higher than all other occupants to modify and approve the rank of the temporary profile.

20. A hierarchical based computer implemented method for controlling predetermined vehicle operations upon receiving requests from vehicle occupants, the method comprising:

identifying vehicle occupants regardless of their location within the vehicle;

matching an identified vehicle occupant who has entered a request with one profile of a hierarchy of stored profiles, each profile corresponding to at least one of the occupants who has been identified and providing authorization to control certain of the predetermined operations, the hierarchy of profiles including a high ranking profile providing authorization to control more of the predetermined operations than a lower ranked profile;

accepting the request to control the requested operation if the matched profile provides authorization to control the requested operation;

rejecting the request to control the requested operation if the matched profile does not provide authorization to control the requested operation; and requesting approval to authorize a previously rejected request from an occupant other than the requesting occupant who has a higher ranked profile than the requesting occupant.

* * * * *